(12) United States Patent
Kessler et al.

(10) Patent No.: US 6,463,523 B1
(45) Date of Patent: Oct. 8, 2002

(54) METHOD AND APPARATUS FOR DELAYING THE EXECUTION OF DEPENDENT LOADS

(75) Inventors: Richard Eugene Kessler, Shrewsbury, MA (US); Rahul Razdan, Princeton, MA (US); Edward John Mclellan, Holliston, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/364,245

(22) Filed: Jul. 29, 1999

Related U.S. Application Data

(60) Provisional application No. 60/118,130, filed on Feb. 1, 1999.

(51) Int. Cl.[7] .............................................. G06F 9/38
(52) U.S. Cl. ...................................... 712/216; 712/202
(58) Field of Search ................................ 712/202, 216, 712/219, 217

(56) References Cited

U.S. PATENT DOCUMENTS

| | | | | |
|---|---|---|---|---|
| 5,615,350 A | | 3/1997 | Hesson et al. ............... | 395/394 |
| 5,619,662 A | | 4/1997 | Steely, Jr. et al. .......... | 395/392 |
| 5,903,739 A | * | 5/1999 | Dice .......................... | 712/216 |
| 5,948,095 A | * | 9/1999 | Arora et al. ................ | 712/200 |
| 6,070,238 A | * | 5/2000 | Feiste ........................ | 712/217 |
| 6,088,774 A | * | 7/2000 | Gillingham .................. | 365/194 |
| 6,108,770 A | * | 8/2000 | Chrysos ...................... | 712/216 |
| 6,112,019 A | * | 8/2000 | Chamdani .................... | 712/214 |
| 6,279,100 B1 | * | 8/2001 | Tremblay ..................... | 712/24 |

\* cited by examiner

*Primary Examiner*—Eric Coleman
(74) *Attorney, Agent, or Firm*—Hamilton, Brook, Smith & Reynolds, P.C.

(57) ABSTRACT

Load/store execution order violations in an out-of-order processor are reduced by determining whether a source address of a load instruction is the same as a destination address of a store instruction on which execution the load instruction depends. If they are the same, then execution of the load instruction is delayed until execution of the store instruction. In an system where virtual registers are mapped to a physical register, the physical registers mapped by the store and load instructions are compared. A table has entries corresponding to instructions in an instruction queue. In each table entry corresponding to a store instruction, the store instruction's destination address offset and physical register reference are saved. A load instruction's source address offset and physical reference are compared with each of the table entries corresponding to store instructions to determine whether a dependency exists. Furthermore, a matrix also has row entries corresponding to instruction queue entries. In addition, each matrix row has a separate indicator for each instruction queue entry. Upon determining that a load instruction is dependent upon a store instruction, the indicator corresponding to the store instruction in the matrix row corresponding to the load instruction is marked, while an indicator is "unmarked" when the corresponding store instruction issues. Execution of any load instruction is delayed while any indicator in the load instruction's corresponding matrix row is marked. When a store instruction executes, all indicators in the column corresponding to the store instruction are unmarked.

46 Claims, 6 Drawing Sheets

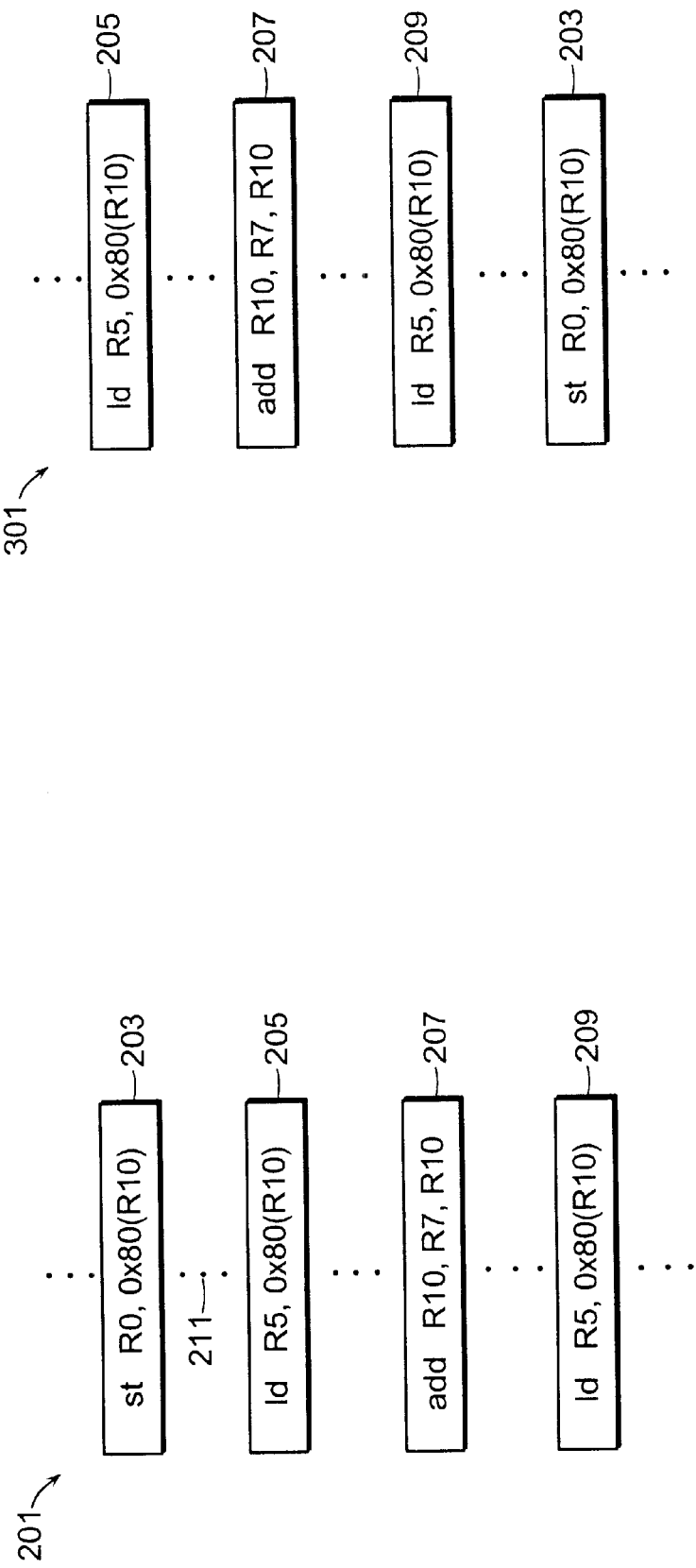

METHOD AND APPARATUS FOR DELAYING THE EXECUTION OF DEPENDENT LOADS

RELATED APPLICATION

This application claims the benefit of U.S. Provisional Application No. 60/118,130, filed on Feb. 1, 1999, the entire teachings of which are incorporated herein by reference.

BACKGROUND OF THE INVENTION

Many modern microprocessors allow instructions to execute out-of-order. This improves performance because it allows more instructions to complete in the same amount of time by efficiently distributing instructions among the computing resources of the microprocessor.

Problems may occur, however, when executing load and store instructions out-of-order. When a load instruction issues before an older store instruction referencing the same address, the load may retrieve an incorrect value because the store data the load should use is not yet present at the address. When hardware detects this condition, it performs a squash in which results from the load instruction and subsequent instructions are ignored and the instructions must be re-executed (replayed). Such hardware recovery degrades processor performance.

Memory reference tagging stores have been proposed in which information regarding the squash is used to predict subsequent memory instruction collisions, and consequently to prevent reordering of certain instructions as appropriate. This general method is described in U.S. Pat. No. 5,619,662 (Steely), "Memory Reference Tagging", dated Apr. 8, 1997 (hereinafter '662 Patent), and incorporated herein by this reference in the entirety.

The '662 Patent describes a technique of detecting dependent out-of-order load and store instructions using a write buffer, which keeps track of executed load and store instructions until it is determined they have executed in their proper order. Four different approaches to handling such an out-of-order detection are described:

In the first approach, part of the referenced (or target) memory address is used as a tag to be associated with each of the out-of-order instructions. If these instructions later appear again in the instruction queue, the fact that they have identical tags will cause them to be issued in order.

The second approach uses an assigned "problem number" as a tag. Two instructions referencing the same memory address and with the same problem number are not re-ordered.

The third approach simply associates a tag bit with an instruction to indicate that other memory reference instructions should not be re-ordered around the tagged instruction.

Finally, the fourth approach turns off reordering for some number of instructions when entering a subroutine.

U.S. Pat. No. 5,615,350 (Hesson), "Apparatus to Dynamically Control the Out-of-Order Execution of Load-Store Instructions in a Processor Capable of Dispatching, Issuing and Executing Multiple Instructions in a Single Processor Cycle," dated Mar. 25, 1997 describes a "store barrier" cache that is used to predict, upon fetching of a store instruction, whether execution of the store instruction will lead to an out-of-order violation. Upon such a prediction, execution of all load instructions is delayed until the store instruction executes.

Another solution to the problem of reordering dependent load instructions is to remember recently squashed loads, and to force those loads to wait for all prior stores the next time they are fetched.

Each of the above approaches suffers a performance degradation because the load is delayed for many more stores then is necessary. Squashes are expensive in that they consume valuable time re-executing code and therefore slow the net instruction execution in a processor. The techniques described above attempt to predict out-of-order load/store violations to avoid such costly out-of-ordering, but these techniques over-compensate by forcing a load to wait unnecessarily.

SUMMARY OF THE INVENTION

The present invention attempts to detect load/store dependencies early, and avoid even a first squash in many cases.

Accordingly, a method of reducing load/store execution order violations in an out-of-order processor comprises determining whether a source address of a load instruction is the same as a destination address of a store instruction on which execution the load instruction depends. If they are the same, then execution of the load instruction is delayed until execution of the store instruction. This determination can be made, for example, during a fetch cycle, by further determining whether any intervening instructions modify the contents of a register referenced by both the load instruction and the store instruction, where source and destination addresses are determined by offsets to a value contained within the register.

In a preferred embodiment, named or virtual registers are mapped to physical registers, in the mapping stage of an instruction pipeline. Each unmodified instance of a virtual register is mapped to a common physical register. Determining whether a source address of a load instruction is the same as a destination address of a store instruction is reduced to determining whether the physical registers used by the store and load instructions are the same, and whether the offsets used in the instructions are the same. This determination is performed during the mapping stage.

A table is provided, which has entries corresponding at least to instructions on which the load instruction may depend, and preferably corresponding to entries in the instruction queue. In each table entry corresponding to a store instruction, the store instruction's destination address offset and physical register reference are saved. Determining whether physical registers used by the store and load instructions are the same comprises comparing the load instruction's source address offset and physical reference with each of the table entries corresponding to store instructions.

Furthermore, a matrix is provided which has a row corresponding at least to each instruction on which the load instruction may depend, preferably to each entry in the instruction queue. In addition, each entry has an indicator for each instruction having an entry in the table. Thus, for an n-entry instruction queue, the matrix forms a n×n matrix, each row corresponding to an instruction in the instruction queue which may depend upon another instruction, and each column corresponding to an instruction in the instruction queue on which other instructions may depend. Upon determining that a load instruction is dependent upon an unexecuted store instruction, the indicator corresponding to the store instruction in the entry corresponding to the load instruction is "marked," while an indicator is "unmarked" when the corresponding store instruction issues. Execution of any load instruction is delayed while any indicator in the load instruction's corresponding entry is marked. When a store instruction executes, all indicators in the column corresponding to the store instruction are unmarked.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a schematic diagram showing an exemplary instruction stream as it enters the instruction queue.

FIG. 3 is a schematic diagram depicting a re-ordered issue stream.

DETAILED DESCRIPTION OF THE INVENTION

Figure 1:
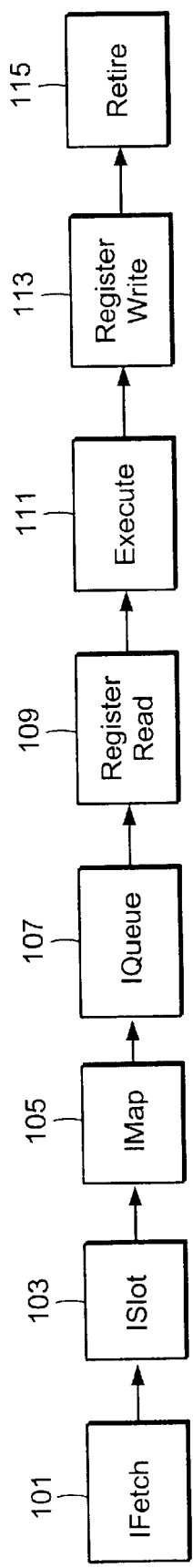
FIG. 1 is a block diagram showing the various stages of a typical instruction pipeline.

FIG. 1 shows the various stages of a typical instruction pipeline. In step 101, one or more instructions are fetched, typically from an instruction cache. Next, in step 103, the instructions are slotted or decoded. In step 105, virtual registers named in the instructions are mapped to physical registers.

In step 107, instructions are written into the instruction queue. The instruction queue decides which instructions are to issue based on available resources such as registers and execution units, and re-orders the instructions accordingly, assigning the issuing instructions to individual execution units.

Next, in step 109, any registers are read as required by the issued instructions. In step 111, the instructions are executed. Any memory references, which must be derived, are calculated during this stage. In step 113, data is written into the registers. Finally, in step 115, instructions are "retired".

FIG. 2 shows an instruction stream 201 as it enters the instruction queue. Instructions are placed in the queue in the order in which they are encountered. The instruction labeled 203, "st R0,0x80(R10)" is a store instruction. When it is executed, the contents of register R0 are stored in a target memory location whose address is the sum of the contents of register R10 and the offset 0x80. Thus, if register R0 holds the value 10, and register R10 holds the value 0x3000, then the value 10 will be stored in memory at the target address 0x3000+0x80=0x3080. Note that since the contents of register R10 are not known beforehand, the target address must be computed during the execution stage 111 of the instruction pipeline.

The instruction labeled 205, "ld R5,0x80(R10)" is a load instruction. When it is executed, the memory location is referenced whose address is again the sum of the contents of register R10 and the offset 0x80. The contents of this "source" memory location is loaded into register R5.

Note that there may be additional instructions between those shown, as indicated by the ellipses 211. For illustrative purposes, it is assumed that instructions not shown do not affect the contents of register R10. Thus, unless something extraordinary occurs, such as an interrupt routine altering the value of register R10, register R10 will normally have the same value in both instructions 203 and 205, and since the offsets are the same, the computed target addresses will also be the same.

The load instruction 205 is therefore dependent upon the store instruction 203 because the load instruction 205 needs to read the data stored in memory by the store instruction 203.

The instruction labeled 207, "add R10, R7, R10," is an add instruction, which adds the contents of register R10 to the contents of register R7, and places the sum into register R10, thus modifying the contents of register R10 (unless the content value of R7 is 0).

The instruction labeled 209 is identical to the first load instruction 205. Here, however, an intervening instruction, i.e., the add instruction 207, will modify the value of R10.

Since the intervening add instruction 207 modifies the contents of register R10, the second load instruction 209, though identical to the first load instruction 205, does not depend on the store instruction 203. Their respective computed target addresses will be different. In the case where R7 holds the value 0, and the targets of the store instruction 203 and the second load instruction 209 actually are the same, the present invention's presumption of non-dependency does no harm. A squash will occur when the dependency is discovered, as would happen without the present invention.

As instructions are fetched, they are placed into the instruction queue. Depending on available resources, instructions are issued out-of-order from the instruction queue. A re-ordered issue stream 301 is depicted in FIG. 3. Here it can be seen that the instructions have been reordered such that the store instruction 201 is issued after the other instructions 205, 207, 209. Where a register such as R10 contains the same value for a load instruction and a store instruction, and where the offsets are the same, the load instruction will potentially be reading in the wrong data because it needs the data to be stored by the store instruction. Such is the case with store instruction 203 and the first load instruction 205. In the prior art, these instructions would be allowed to issue out-of-order at least once, and only later, when the targets are calculated and the dependency discovered, would a squash occur. By detecting early on that both instructions access the same memory locations, the present invention delays execution of the load and completely avoids the need for a squash.

Figure 4A:
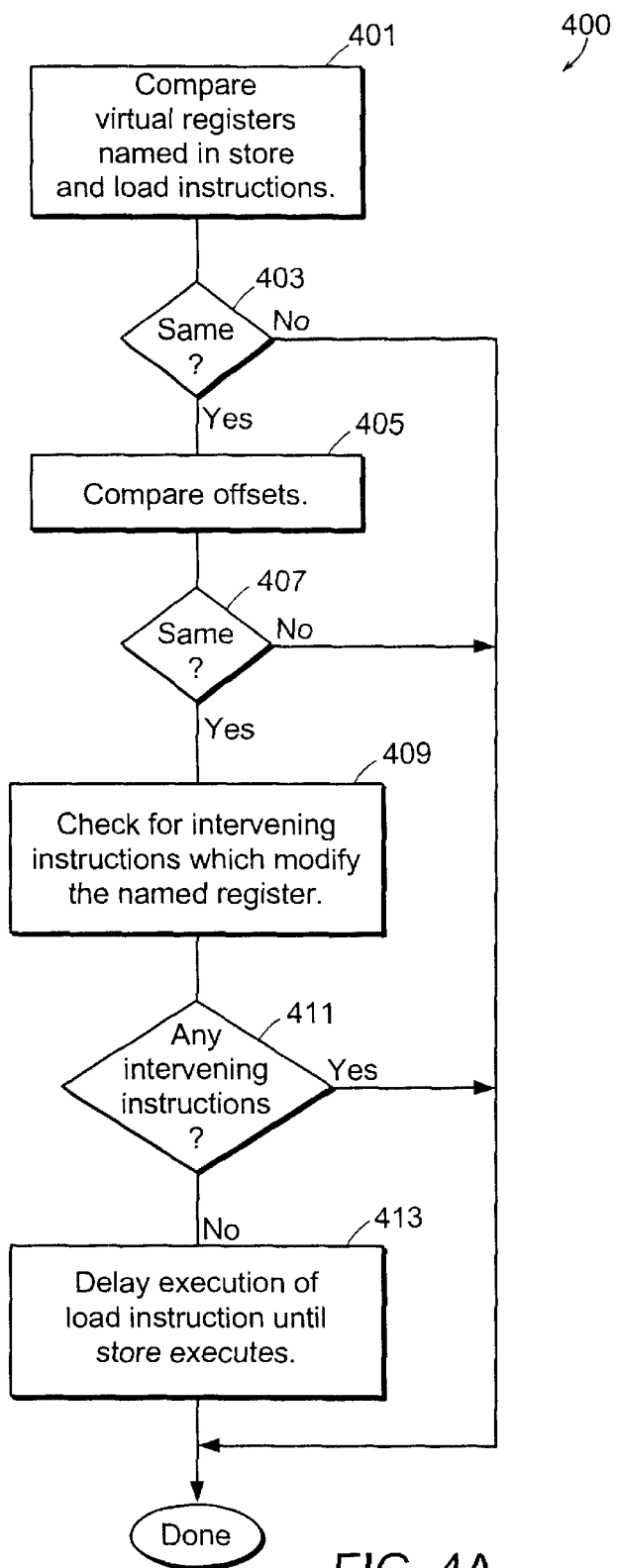
FIGS. 4A and 4B are flowcharts illustrating virtual register compare and physical register compare embodiments of the present invention, respectively.

The present invention examines the registers referenced by load and store instructions, before the execution stage, to determine dependencies. In one embodiment, illustrated in the flowchart 400 of FIG. 4A, the virtual registers of a store and a load instruction, i.e., the registers named in the instruction, are examined (Steps 401, 403). If the same virtual register is named in both instructions, and the offsets are the same (Steps 405, 407), and if no intervening instructions modify the contents of the named register (Steps 409, 411), then the load is delayed until the store executes (Step 413), thus completely avoiding even a first squash and its accompanying overhead.

Figure 4B:
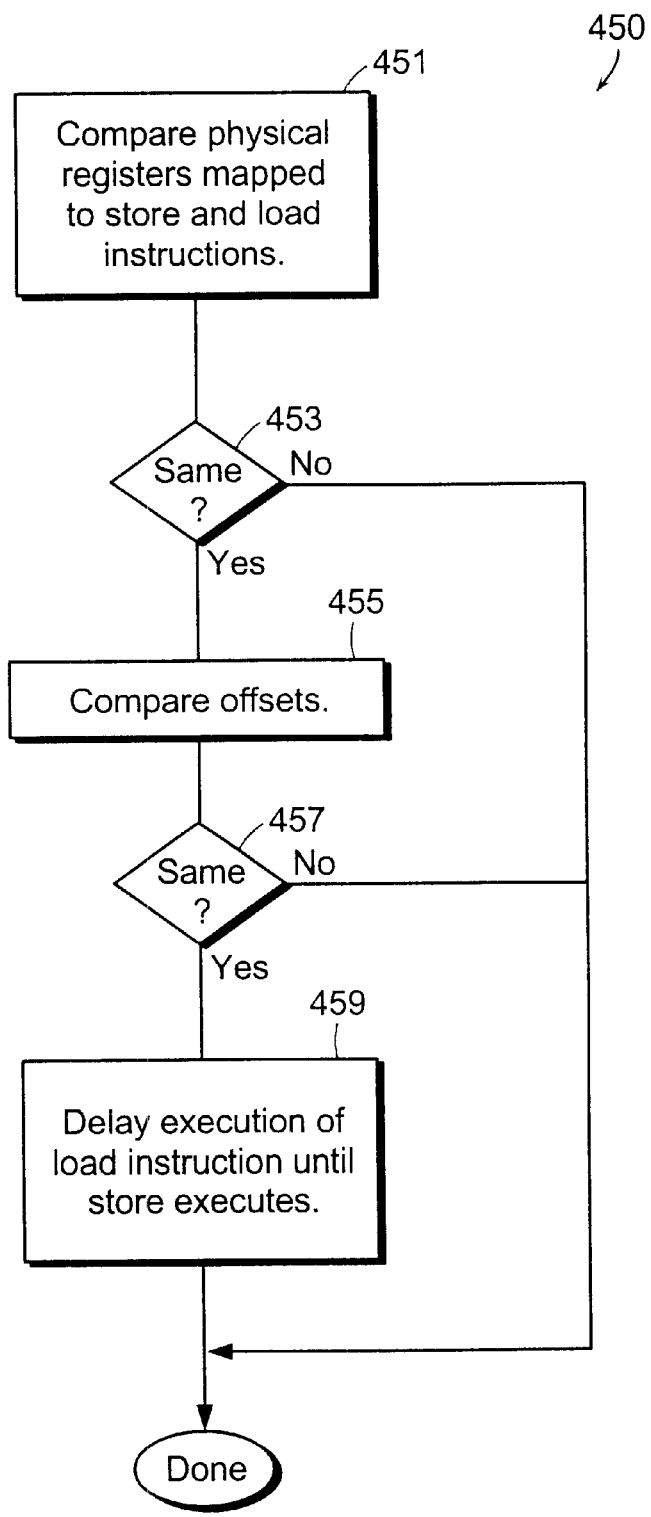

In an alternate embodiment, illustrated in the flowchart 450 of FIG. 4B, once the instructions have been queued and physical registers have been assigned, or mapped, to them, then the fact that the physical registers are the same, as determined in Steps 451, 453, indicates that there has been no intervening instruction which changed the register. Again, in this case, if the offsets are the same (Steps 455, 457), then the load is delayed until the store executes (Step 459).

In either embodiment, when there are intervening instructions that modify the contents of the register, no delay is necessary, and ordinarily there will be no squash. One exception, of course, is in a case where the intervening instruction writes to the register but not does actually change the value. Since the register did not actually change value, but the load was not delayed, a squash will result.

Referring again to FIGS. 2 and 3, where no intervening instructions modify the contents of register R10, such as between the store instruction 203 and the first load instruction 205, R10 will hold the same value for the store and load instructions. That is, both instructions 203, 205 will access the same memory location, whose address is the sum of the contents of register R10 and the offset 0x80. In this case, there is a dependency—that is, the load instruction depends on the value stored by the store instruction, and the load's execution must be delayed until the store instruction is executed. By delaying the load's execution, a costly squash is avoided.

If, on the other hand, an intervening instruction, such as add instruction 207, modifies the contents of register R10 between the store instruction 203 and a load instruction 209, then the value contained in R10 will not be identical in both instructions 203, 209, and the load's 209 execution is not delayed.

Similarly, if there were no intervening instructions which modify the contents of register R10, but if the load instruction were, for example, "ld R5, 0x70(R10)," where the offset is now 0x70 rather than 0x80, the load would not be delayed because the offsets used by the load and store instructions are different. Note that there is no need to know the actual values of R10.

The system in which the present invention preferably operates uses virtual registers and physical registers. That is, a bank of physical registers is available. Registers named in the instruction opcodes, such as R10, are "virtual" registers, and are assigned, or mapped, to physical registers during the mapping stage. A virtual register is mapped to the same physical register until the value (content) of the virtual register is modified. Each incidence of a different value for a register is mapped to a different physical register. Thus, if a load instruction and store instruction map to the same physical register, this implies that (1) they both reference the same virtual register, and (2) no intervening instruction modified the virtual register. Thus, this alternate preferred embodiment need only compare physical register mappings during the mapping phase.

Figures 5, 6:
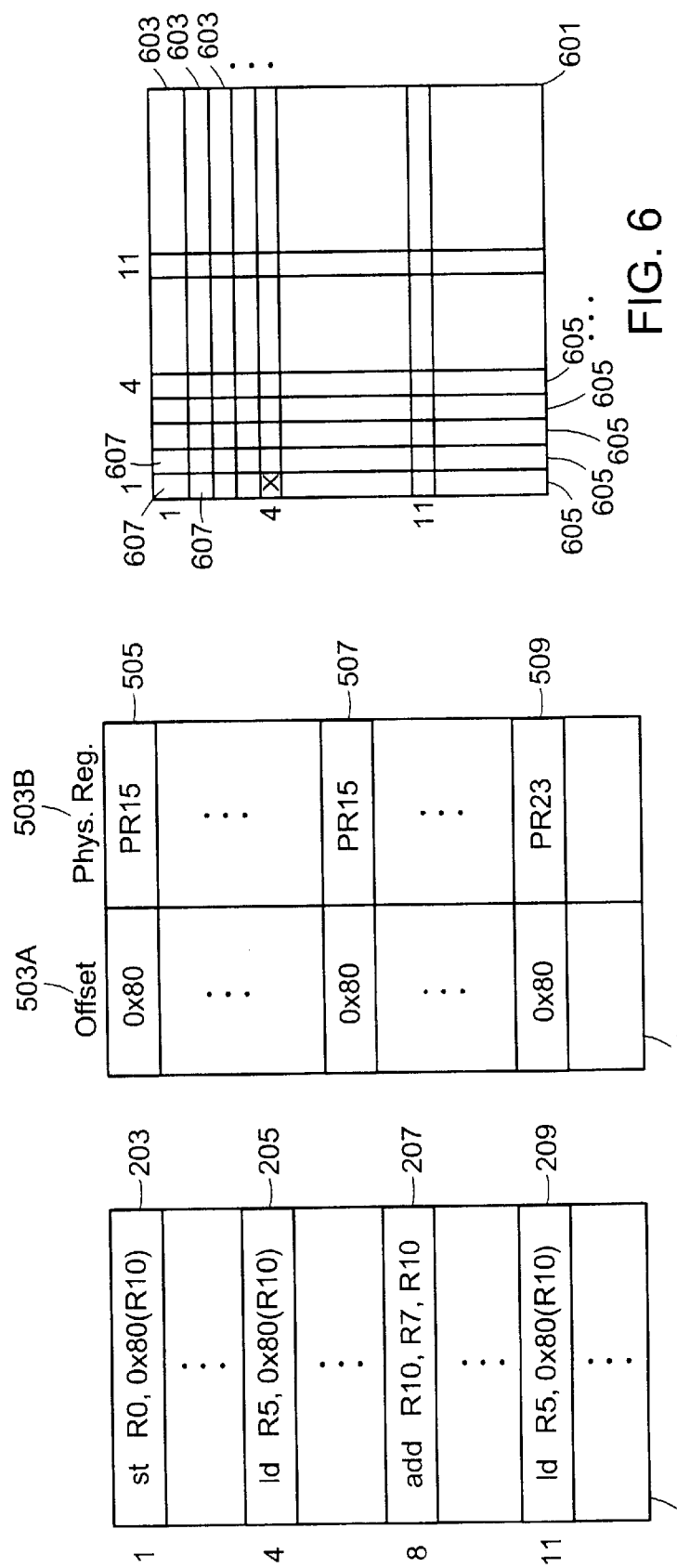
FIG. 5 is a block diagram illustrating an instruction queue and an offset/physical reference table as employed in the present invention.
FIG. 6 is a block diagram illustrating a load/store matrix of a preferred embodiment of the present invention.

FIG. 5 illustrates a preferred embodiment in which physical registers are compared. As instructions are fetched, they are placed in the instruction queue 501, which in one embodiment holds up to twenty instructions, here numbered 1–20. Instructions 203–209 are shown. While instructions are fetched in program order, they may issue and execute out-of-order, depending on the availability of resources.

Table 503 has an entry associated with each instruction queue entry. Each table entry corresponding to a store instruction 505 holds the offset of the instruction in an offset field 503A and the physical register mapped to the instruction in a register field 503B. Here, the store instruction's offset is 0x80, and its named, virtual register, R10, has been mapped to physical register PR15. Alternatively, offsets and mapped physical registers could be stored for other instructions, as well, such as loads.

As a load instruction enters the queue 501, its offset and mapped physical register are compared with each entry in the table 503, preferably in a content-addressable memory (CAM) operation. Here, the first load instruction 205 has the same offset, 0x80, as the store instruction 203, and the same mapped physical register PR15. Thus, there is a dependency, and execution of the load 205 is delayed until after issuance of the store instruction 203 which is associated with the matching entry.

As the second load instruction 209 enters the queue 501, its offset and mapped physical register are compared with each entry in the table 503. Because R10 is modified by intervening add instruction 207, the mapped physical register, PR23, is different. No match is found, and execution of the load 209 is not delayed.

FIG. 6 illustrates a matrix 601 having a row or entry 603 and a column 605 for each instruction queue entry. Each row 603 thus has an indicator 607 for each instruction queue entry. In this example, rows indicate dependent loads and columns indicate stores. Obviously these roles can be reversed. When a load depends on a store, the indicator at the intersection of the load's corresponding row and the store's corresponding column is marked, or flagged.

For example, for a 20-entry instruction queue, the corresponding matrix is a 20 by 20 indicator matrix. When a dependency is found between the store instruction 203 and the load instruction 205 in instruction queue entry 4, for example, the first indicator in row 4 of the matrix 601, corresponding to the unissued store 203 in instruction queue entry 1, on which the load 205 depends, is marked. Now, the execution of any load instruction in the queue having a corresponding matrix entry with at least one marked indicator (there could be more than one load dependent on a single store) is delayed. As a store issues from the instruction queue, all of the indicators in the matrix column, e.g., column 1, corresponding to that store, are cleared, or unmarked.

The same technique can be employed at various pipeline stages such as mapping, fetching, or even earlier. For example, the method of the present invention is performed within at the compiler stage, using, for example, extra instructions, or flags to indicate which instructions to delay, according to another embodiment.

Figure 7:
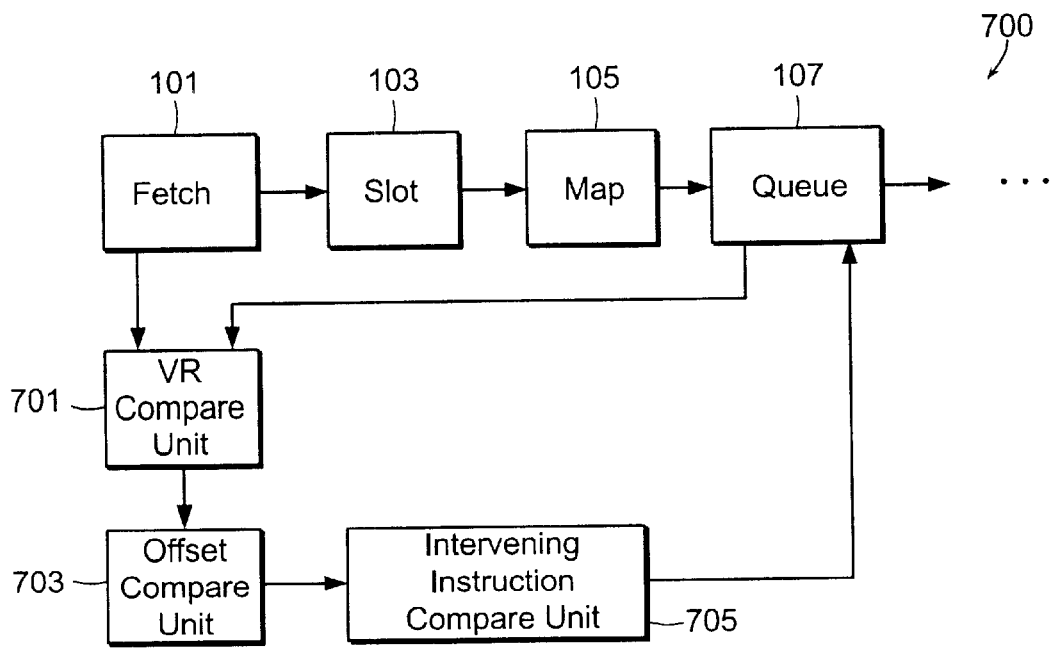
FIG. 7 is a block diagram illustrating a preferred embodiment of the present invention in which virtual registers are compared.

FIG. 7 illustrates a preferred embodiment 700 in which the comparison is done during the fetch stage 101, using virtual registers. A virtual register compare unit 701 compares the named virtual registers of recently fetched load instructions with those of store instructions in the queue 107. If there is no match, the load instructions are not delayed. If there is a match, then the offsets of the matching instructions are compared by an offset compare unit 703. Again, if there is no offset match, the load instructions are not delayed. If there is a match, then an intervening instruction compare unit 705 determines whether any intervening instructions modify the virtual register used by the matching load and store instructions. If there are such intervening instructions, the load instruction is not delayed. If there are not any intervening instructions, the load instruction is delayed. Note that if a load is by mistake not delayed when it should be, as when an intervening instruction or instructions do not actually change the value of the register, a squash will occur. Since this is what would occur without the present invention, no extra penalty is incurred.

Figure 8:
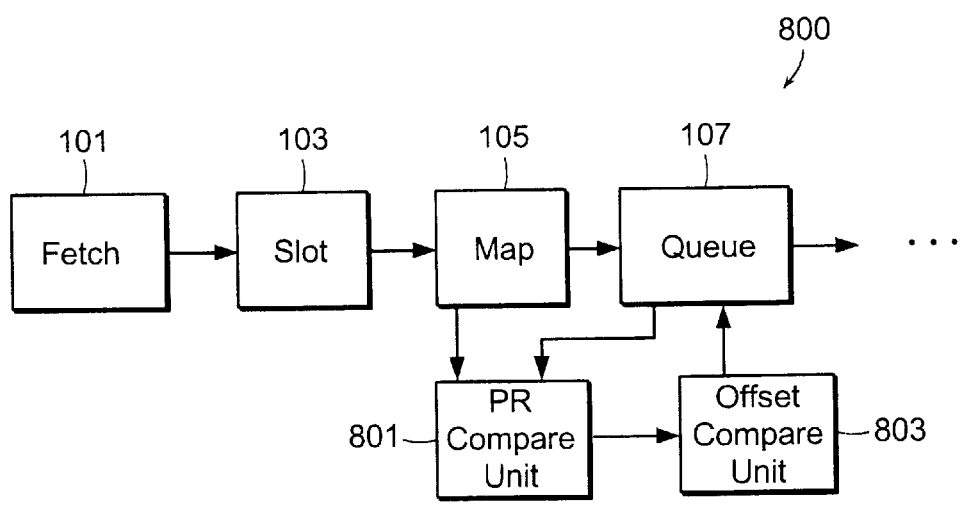
FIG. 8 is a block diagram illustrating a preferred embodiment of the present invention in which physical registers are compared.

FIG. 8 illustrates a preferred embodiment 800 in which the comparison is done during the mapping stage 105, using physical registers. A physical register compare unit 801 compares the assigned physical registers of mapped load instructions with those of store instructions in the queue 107. If there is no match, the load instructions are not delayed. If the physical registers match, then the offsets of the matching load and store instructions are compared by an offset compare unit 803. Again, if there is no match, the load instruction is not delayed. If there is a match, the matching load instruction is delayed.

In the above description, the terms "store instruction" or "store" refer to any instruction which writes to memory. The terms "load instruction" or "load" refer to any instruction which reads from memory.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of reducing load/store execution order violations in an out-of-order processor, the method comprising:

determining whether a fetched, unexecuted load instruction is dependent on a fetched, unexecuted store instruction, based on a determination of whether a source address referenced by the load instruction is the same as a destination address referenced by the store instruction, prior to a determination of the source and destination addresses; and responsive to said step of determining, delaying execution of the load instruction until execution of the store instruction.

2. The method of claim 1, the source and destination addresses being calculable based on contents of registers referenced by the load and source instructions respectively, wherein the determination of whether a source address is the same as a destination address comprises:

determining whether the load instruction and the store instruction reference a same register.

3. The method of claim 2, wherein the determination of whether a source address is the same as a destination address further comprises:

determining whether any intervening instructions modify the contents of a register referenced by both the load instruction and the store instruction.

4. The method of claim 3, wherein the determination of whether a source address is the same as a destination address further comprises:

comparing offsets included in the load and store instructions, source and destination addresses being further calculable based on the offsets.

5. The method of claim 2, wherein the determination of whether a source address of a load instruction is the same as a destination address of a store instruction is performed during an instruction fetch stage.

6. The method of claim 2, wherein referenced registers are virtual registers named in the load and store instructions.

7. The method of claim 2, wherein the referenced registers are physical registers mapped, during a mapping stage, from virtual registers named in the load and store instruction.

8. The method of claim 7, wherein the step of determining whether a source address of a load instruction is the same as a destination address of a store instruction is performed during the mapping stage.

9. The method of claim 7, wherein each unmodified instance of a virtual register is mapped to a common physical register.

10. The method of claim 9, wherein the determination of whether the source and destination addresses are the same is further based on a comparison of offsets to the source and destination addresses.

11. The method of claim 9, wherein:

the determination of whether a source address is the same as a destination address further comprises determining whether the physical registers used by the store and load instructions are the same.

12. The method of claim 11, further comprising:

providing a table having entries corresponding at least to instructions on which the load instruction may depend;

saving, in each table entry corresponding to a store instruction, the store instruction's destination address offset and physical register reference;

wherein the step of determining whether physical registers used by the store and load instructions are the same further comprises comparing the load instruction's source address offset and physical reference with at least each of the table entries corresponding to store instructions.

13. The method of claim 12, further comprising:

providing a matrix having an entry corresponding at least to each instruction on which the load instruction may depend, and including the load instruction, each entry having an indicator corresponding at least to each instruction having an entry in the table;

upon determining that a load instruction is dependent on a store instruction, marking the indicator corresponding to the store instruction in the entry corresponding to the load instruction;

unmarking said indicator when the store instruction issues; and delaying execution of the load instruction while any indicator in the load instruction's corresponding entry is marked.

14. The method of claim 13, further comprising:

when the store instruction executes, unmarking, in each entry, the indicator corresponding to the store instruction; and delaying execution of every load instruction having an entry with a marked indicator.

15. The method of claim 9, wherein the determination of whether a source address of a load instruction is the same as a destination address of a store instruction is performed during a mapping stage.

16. A method of reducing load/store execution order violations in an out-of-order processor, the method comprising:

fetching instructions and placing them in an instruction queue;

determining whether a fetched, unexecuted load instruction is dependent on a queued, unexecuted store instruction, based on a determination of whether a source address referenced by the load instruction is the same as a destination address referenced by the store instruction prior to a determination of the source and destination addresses; and responsive to said determination, delaying execution of the load instruction until execution of the store instruction.

17. The method of claim 16, wherein virtual registers named in the load and store instructions are mapped to physical registers, each unmodified instance of a virtual register being mapped to a common physical register, the determination of whether the source and destination addresses are the same comprising:
   determining whether both instructions reference the same register physical register; and
   comparing offsets to the source and destination addresses.

18. The method of claim 17, wherein the determination of whether a source address is the same as a destination address further comprises:
   determining whether any intervening instructions modify the contents of a register referenced by both the load instruction and the store instruction.

19. The method of claim 18, further comprising:
   providing a table having a plurality of table entries, each table entry corresponding to an instruction queue entry;
   saving, in each table entry corresponding to a store instruction, the store instruction's destination address offset and physical register reference;
   wherein the step of determining whether the physical registers used by the store and load instructions are the same further comprises comparing the load instruction's source address offset and physical reference with at least each of the table entries corresponding to store instructions.

20. The method of claim 19, further comprising:
   providing a matrix having a plurality of matrix entries, each matrix entry corresponding to an instruction queue entry, each matrix entry having a plurality of indicators, each indicator corresponding to an instruction queue entry;
   upon determining that a load instruction is dependent on a store instruction, marking the indicator corresponding to the store instruction in the matrix entry corresponding to the load instruction;
   unmarking said indicator when the store instruction executes; and
   delaying execution of the load instruction while any indicator in the load instruction's corresponding matrix entry is marked.

21. The method of claim 20, further comprising:
   when the store instruction executes, unmarking, in each matrix entry, the indicator corresponding to the store instruction; and
   delaying execution of every load instruction having a matrix entry with a marked indicator.

22. An apparatus for reducing load/store execution order violations in an out-or-order processor, comprising:
   a detection unit which determines whether a fetched, unexecuted load instruction is dependent on a fetched, unexecuted store instruction, based on a determination of whether a source address referenced by the load instruction is the same as a destination address referenced by the store instruction, prior to a determination of the source and destination addresses; and
   an execution unit, which, responsive to the detection unit, delays execution of the load instruction until execution of the store instruction.

23. The apparatus of claim 22, the source and destination addresses being calculable based on contents of registers referenced by the load and source instructions respectively, wherein the determination of whether a source address is the same as a destination address is further based on a determination of whether the load instruction and the store instruction reference a same register.

24. The apparatus of claim 23, wherein the detection unit determines whether any intervening instructions modify the contents of a register referenced by both the load instruction and the store instruction.

25. The apparatus of claim 24, wherein the detection unit determines source and destination addresses by offsets to a value contained within the register, the offsets being specified in the load and store instruction respectively.

26. The apparatus of claim 23, wherein the detection unit performs during an instruction fetch stage.

27. The apparatus of claim 23, wherein the referenced registers are virtual registers.

28. The apparatus of claim 23, wherein the referenced registers are physical registers mapped, during a mapping stage, from virtual registers named in the load and store instructions.

29. The apparatus of claim 28, wherein the detection unit performs during the mapping stage.

30. The apparatus of claim 28, wherein each unmodified instance of a virtual register is mapped to a common physical register.

31. The apparatus of claim 30, wherein the detection unit determines whether the source and destination addresses are the same by comparing offsets specified in the load and store instructions.

32. The apparatus of claim 30, wherein the detection unit compares the addresses during a mapping stage.

33. The apparatus of claim 30, wherein:
   the detection unit determines whether the registers used by the store and load instructions refer to a common physical register.

34. The apparatus of claim 33, further comprising:
   a table having entries corresponding at least to instructions on which the load instruction may depend, wherein a store instruction's destination address offset and physical register reference are saved in a table entry corresponding to the store instruction;
   wherein the detection unit compares the load instruction's source address offset and physical reference with at least each of the table entries corresponding to store instructions.

35. The apparatus of claim 34, further comprising:
   a matrix having an entry corresponding at least to each instruction on which the load instruction may depend, and including the load instruction, each entry having an indicator corresponding at least to each instruction having an entry in the table, such that
      responsive to the detection unit determining that a load instruction is dependent on a store instruction, the indicator corresponding to the store instruction in the entry corresponding to the load instruction is marked,
      the indicator is unmarked when the store instruction issues, and
      execution of the load instruction is delayed while any indicator in the load instruction's corresponding entry is marked.

36. The apparatus of claim 35, wherein, in each entry, the indicator corresponding to the store instruction is unmarked when the store instruction executes, and execution of every load instruction having an entry with a marked indicator is delayed.

37. An instruction pipeline circuit for reducing load/store execution older violations in an out-of-order processor, comprising:

- a detection circuit that determines whether a fetched, unexecuted load instruction is dependent on a fetched, unexecuted store instruction by
  - determining whether a source address referenced by the load instruction is the same as a destination address referenced by the store instruction, prior to a determination of the source and destination addresses, and
  - determining whether any intervening instructions modify the contents of a register referenced by both the load instruction and the store instruction, wherein the source and destination addresses are determined by offsets to a value contained within the register, the offsets being specified in the load and store instructions respectively; and
- an execution circuit, which, responsive to the detection unit, delays execution of the load instruction until execution of the store instruction.

38. The instruction pipeline circuit of claim 37, wherein the detection circuit operates during an instruction fetch stage.

39. The instruction pipeline circuit of claim 37, wherein the register is a virtual register, and wherein the virtual register is mapped to a physical register, and wherein the detection circuit operates during a mapping stage.

40. The instruction pipeline circuit of claim 39, further comprising:

- a first memory circuit forming a table, the table having entries corresponding at least to instructions on which the load instruction may depend, wherein a store instruction's destination address offset and physical register reference are saved in a table entry corresponding to the store instruction;
- wherein the detection circuit determines whether the store and load instructions reference a common physical register, the detection circuit further comprising
  - a comparing circuit that compares the load instruction's source address offset and physical reference with at least each of the table entries corresponding to store instructions.

41. The instruction pipeline circuit of claim 40, further comprising:

- a second memory circuit forming a matrix, the matrix having an entry corresponding at least to each instruction on which the load instruction may depend, and including the load instruction, each entry having an indicator corresponding at least to each instruction having an entry in the table, such that
  - responsive to the detection circuit determining that a load instruction is dependent on a store instruction, the indicator corresponding to the store instruction in the entry corresponding to the load instruction is marked,
  - the indicator is unmarked when the store instruction issues, and
  - execution of the load instruction is delayed while any indicator in the load instruction's corresponding entry is marked.

42. A system board comprising an integrated circuit, which includes an instruction pipeline circuit for reducing load/store execution order violations in an out-of-order processor, the instruction pipeline circuit comprising:

- a detection circuit that determines whether a fetched, unexecuted load instruction is dependent on a fetched, unexecuted store instruction, by determining
  - whether a source address referenced by the load instruction is the same as a destination address referenced by the store instruction, prior to a determination of the source and destination addresses, and
  - determining whether any intervening instructions modify the contents of a register referenced by both the load instruction and the store instruction, wherein the source and destination addresses are determined by offsets to a value contained within the register, the offsets being specified in the load and store instructions respectively; and
- an execution circuit, which, responsive to the detection unit, delays execution of the load instruction until execution of the store instruction.

43. An apparatus for reducing load/store execution order violations in an out-of-order processor, comprising:

- detection means for determining whether a fetched, unexecuted load instruction is dependent on a fetched, unexecuted store instruction, by determining whether a source address referenced by the load instruction is the same as a destination address referenced by the store instruction, prior to a determination of the source and destination addresses; and
- execution delay means, which, responsive to the detection means, for delaying execution of the load instruction until execution of the store instruction.

44. The apparatus of claim 43, wherein virtual registers named in the load and store instructions are mapped to physical registers, the source and destination addresses being calculable based on contents of the physical registers, further comprising:

- first storage means for saving a store instruction's destination address offset and physical register reference, the detection means comparing a load instruction's source address offset and physical reference with each of the saved store instructions' destination address offset and physical register reference; and
- second storage means for saving a plurality of indicators, an indicator corresponding at least to each instruction having a reference saved in the first storage means and to each instruction in an instruction queue, wherein execution of the load instruction is delayed while any indicator indicating the load instruction is marked.

45. An apparatus for reducing load/store execution order violations in an out-of-order processor, comprising:

- a virtual register compare unit which compares a virtual register named by a fetched, unissued load instruction with virtual registers named by a fetched, unexecuted store instructions which are intended to execute prior to the load instruction;
- an offset compare unit which, responsive to the virtual register compare unit, compares offsets of load instructions with offsets of store instructions naming the same virtual register as the load instruction; and
- an intervening instruction compare unit which, responsive to the offset compare unit and prior to a determination of addresses referenced by the virtual registers, determines, for each load/store instruction pair found by the offset compare unit to have identical offsets, whether at least one intervening instruction exists between the load and store instructions of the load/store instruction pair, which modifies the virtual register named by the load and store instructions, such that if no such intervening instruction exists, issuance of the load instruction is delayed until after execution of the store instruction.

46. An apparatus for producing load/store execution order violations in an out-of-order processor, comprising:

a physical register compare unit which compares a physical register mapped to a fetched, unissued load instruction with physical registers mapped to fetched, unexecuted store instructions which are intended to execute prior to the load instruction;

an offset compare unit which, responsive to the physical register compare unit and prior to a determination of addresses referenced by the physical registers, compares offsets of load instructions with offsets of store instructions which are mapped to the same physical register as the load instruction, such that if a load instruction and store instruction are mapped to an identical physical register, issuance of the load instruction is delayed until after execution of the store instruction.

* * * * *

UNITED STATES PATENT AND TRADEMARK OFFICE
CERTIFICATE OF CORRECTION

PATENT NO. : 6,463,523 B1
DATED : October 8, 2002
INVENTOR(S) : Richard E. Kessler, Rahul Razdan and Edward J. Mclellan It is certified that error appears in the above-identified patent and that said Letters Patent is hereby corrected as shown below:

Column 9,
Line 53, delete "out-or-order" and insert -- out-of-order --.

Column 11,
Line 2, delete "older" and insert -- order --.

Column 13,
Line 9, delete "producing" and insert -- reducing --.

Signed and Sealed this

Fourth Day of February, 2003

JAMES E. ROGAN
*Director of the United States Patent and Trademark Office*